US007315095B2

(12) United States Patent
Kagemoto et al.

(10) Patent No.: US 7,315,095 B2
(45) Date of Patent: Jan. 1, 2008

(54) VOLTAGE REGULATING APPARATUS SUPPLYING A DRIVE VOLTAGE TO A PLURALITY OF LOADS

(75) Inventors: Noboru Kagemoto, Kanagawa (JP); Kyoichiro Araki, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 263 days.

(21) Appl. No.: 11/092,005

(22) Filed: Mar. 29, 2005

(65) Prior Publication Data

US 2005/0248322 A1 Nov. 10, 2005

(30) Foreign Application Priority Data

Mar. 30, 2004 (JP) ............................. 2004-099780
Feb. 16, 2005 (JP) ............................. 2005-038696

(51) Int. Cl.
*G05F 1/00* (2006.01)
*H02J 1/00* (2006.01)
*G09G 3/32* (2006.01)

(52) U.S. Cl. .......................................... 307/39; 345/82

(58) Field of Classification Search ................ 315/308, 315/216, 294, 297; 327/67, 74, 75; 307/39, 307/38, 37, 12; 323/269; 345/82
See application file for complete search history.

(56) References Cited

U.S. PATENT DOCUMENTS

| | | | | |
|---|---|---|---|---|
| 5,438,286 | A * | 8/1995 | Pavlin et al. | 327/50 |
| 5,760,613 | A * | 6/1998 | Pulvirenti et al. | 327/67 |
| 6,396,466 | B1 * | 5/2002 | Pross et al. | 345/82 |
| 6,456,156 | B1 * | 9/2002 | Frey et al. | 327/541 |
| 6,480,043 | B2 * | 11/2002 | Hall et al. | 327/108 |
| 6,822,403 | B2 * | 11/2004 | Horiuchi et al. | 315/307 |
| 6,864,867 | B2 * | 3/2005 | Biebl | 345/82 |
| 6,949,892 | B2 * | 9/2005 | Horiuchi et al. | 315/308 |
| 7,116,052 | B2 * | 10/2006 | Ito et al. | 315/77 |
| 2002/0140380 | A1 * | 10/2002 | Biebl | 315/291 |
| 2005/0231127 | A1 * | 10/2005 | Yamamoto et al. | 315/224 |

FOREIGN PATENT DOCUMENTS

JP 2003-187614 7/2003

OTHER PUBLICATIONS

WO 2003/096436 Horiuchi, Light Emitting Drive Device and Electronic Device Having Light Emiting Element, WIPO, Nov. 20, 2003, pp. 1-24.*

* cited by examiner

*Primary Examiner*—Karl Easthom
*Assistant Examiner*—Harry Behm
(74) *Attorney, Agent, or Firm*—Cantor Colburn LLP

(57) ABSTRACT

In a soft start period after power-on, a voltage regulating apparatus checks LED by LED to determine whether the LED is mounted on a position to receive a drive voltage. After the soft start period, the voltage regulating apparatus monitors the driving status of each of the plurality of LEDs. When it is determined as a result of monitoring that the driving status of at least one of the LEDs is improper, the voltage regulating apparatus increases the drive voltage. In this process, the monitoring on an LED determined to be unmounted as a result of a mount checking process is invalidated. With this, it is ensured that a result of monitoring on the LED unmounted is prevented from affecting the increasing of the drive voltage.

7 Claims, 6 Drawing Sheets

VOLTAGE REGULATING APPARATUS SUPPLYING A DRIVE VOLTAGE TO A PLURALITY OF LOADS

BACKGROUND OF THE INVENTION

1. Field of the Invention

The present invention relates to a voltage regulating apparatus and a voltage regulating method and, more particularly, to a technology for controlling a drive voltage supplied to a target load.

2. Description of the Related Art

Battery-driven portable equipment such as cell phones and personal data assistants (PDA) use light-emitting diodes (LED) for a variety of purposes. For example, LEDs are used as backlight of a liquid crystal display (LCD) or an electronic flash light for a charge-coupled device (CCD) camera. LEDs emitting different colors are operated to blink for illumination. In order to drive an LED, a battery voltage of about 3.6V of, for example, a lithium ion battery should be boosted to a drive voltage of about 4.5V. When the battery voltage drops due to battery consumption, the battery voltage should be boosted by a higher step-up ratio.

Thus, in order to maintain the proper driving status of the target load such as an LED, the step-up ratio should be properly controlled in accordance with the operating environment. For example, a patent document No. 1 discloses a rear combination lamp apparatus for vehicle use that controls the step-up ratio so that a drive voltage of about 16V continues to be supplied to an LED unit comprising 8 LEDs connected in series when the battery voltage in the vehicle drops.

[Patent Document No. 1]

Japanese Published Patent Application No. 2003-187614

Some cell phones available these days comprise loads, such as a plurality of LEDs connected in parallel. The technology of the patent document No. 1 cannot be applied to such equipment. A new perspective is required in regard to the control of drive voltage supplied to loads such as a plurality of LEDs.

SUMMARY OF THE INVENTION

The present invention has been done in view of the aforementioned circumstances and its object is to enable a driving status in which a plurality of loads are properly driven and to provide a voltage regulating apparatus and a voltage regulating method for effectively controlling the drive voltage supplied to the loads.

The present invention according to one aspect provides a voltage regulating apparatus. The voltage regulating apparatus according to this aspect comprises: a voltage supplying circuit which applies a drive voltage to an end of each of a plurality of loads; a mount checking circuit which checks, load by load, to determine whether each of the plurality of loads is mounted; a monitoring circuit which monitors a voltage occurring at the other end of each of the plurality of loads as a result of applying the drive voltage or which monitors an associated voltage, the monitoring being done load by load; and a boost control circuit which increases the drive voltage output from the voltage supplying circuit when it is determined as a result of the monitoring by the monitoring circuit that the monitored voltage drops below a preset voltage. The monitoring circuit invalidates the monitoring on a load determined to be unmounted as a result of the checking by the mount checking circuit, so as to prevent a result of monitoring on the load unmounted from affecting the control on the drive voltage by the boost control circuit.

According to this aspect, the result of monitoring of a load not mounted is prevented from causing the step-up ratio to vary.

The mount checking circuit may check a voltage at a monitored terminal monitored by the monitoring circuit, the checking being done on an assumption that the voltage is fixed at a predetermined value in a situation where a load is not connected to the monitored terminal.

By connecting the monitored terminal to a terminal fixed at a predetermined level of voltage such as a ground potential or a power supply voltage when the load is not mounted, a determination on the mounting status can be made by referring to the voltage at the monitored terminal.

The mount checking circuit may be provided with a plurality of voltage comparators which compare, for each of the plurality of loads, the voltage at the monitored terminal with a predetermined threshold voltage and may determine that a load is not connected to the monitored terminal when the voltage at the monitored terminal is lower.

The mount checking circuit may perform the checking during a predetermined period of time and may further be provided with a latch circuit which holds a result of checking. The monitoring circuit may validate or invalidate the monitoring in accordance with an output from the latch circuit on a continuous basis. The predetermined period of time may be a period required for the apparatus to make a transition in operating mode.

The monitoring circuit may monitor a voltage applied to each of a plurality of constant current circuits each connected in series with a corresponding one of the plurality of loads. With this, it is possible to prevent a situation in which the voltage applied to the constant current circuit drops to disable a predetermined constant current to be generated and to cause the current through the load to vary.

The monitoring circuit may be provided with a plurality of voltage comparators each of which compares the voltage applied to a corresponding one of the plurality of constant current circuits with the preset voltage.

The mount checking circuit and the monitoring circuit may time-share a single comparator for a given one of the plurality of loads. By allowing the mount checking circuit and the monitoring circuit to check and monitor the voltage occurring at the same terminal, only one set of voltage comparators need to be provided.

The voltage at the monitored terminal may be input to one input terminal of the single comparator for the given one of the plurality of loads, and one of a reference voltage to be used in the monitoring circuit and a reference voltage to be used in the mount checking circuit may switchably be input to the other input terminal.

The present invention according to another aspect provides an electronic equipment. The electronic equipment is provided with a plurality of light-emitting devices and a voltage regulating apparatus which drives the plurality of light-emitting devices. In this equipment unit, the plurality of light-emitting devices can be driven in a stable manner.

The present invention according to another aspect encompasses an apparatus as follows. The voltage regulating apparatus according to this aspect comprises: a voltage supplying circuit which applies a drive voltage to an end of each of a plurality of loads; a mount checking circuit which checks, load by load, to determine whether each of the plurality of loads is mounted at a position to receive the drive voltage; a monitoring circuit which monitors a voltage occurring at the other end of each of the plurality of loads as a result of applying the drive voltage or which monitors an associated voltage, the monitoring being done load by load; and a boost control circuit which increases the drive voltage when it is determined as a result of the monitoring by the monitoring circuit that the voltage occurring at the other end or the associated voltage drops below a preset voltage. The monitoring circuit invalidates the monitoring by the monitoring circuit on a load determined to be unmounted as a result of checking, so as to prevent the monitoring circuit from affecting the boosting operation by the boost control circuit. According to this aspect, it is ensured that the drive voltage is increased by referring to the results of monitoring of the loads determined to be mounted. Accordingly, effective control of the drive voltage is achieved.

The mount checking circuit may perform the checking on an assumption that a voltage, at a position to which an unmounted load should otherwise be connected, is fixed at a predetermined value. With this, the checking may be done on an assumption that the load determined to be unmounted is connected to the ground potential or a power supply potential. The mount checking circuit may perform the checking during a predetermined period of time and may further be provided with a latch circuit which holds a result of checking. The monitoring circuit may validate or invalidate the monitoring in accordance with an output from the latch circuit on a continuous basis. The mount checking circuit and the monitoring circuit may time-share a single comparator for a given one of the plurality of loads. With this, it is not necessary to provide comparators for each of the mount checking circuit and the monitoring circuit. Accordingly, the required space is reduced. The predetermined period of time may be a period required for the apparatus to make a transition in operating mode.

The present invention according to yet another aspect provides a voltage regulating method. The voltage regulating method according to this aspect comprises the steps of: monitoring a driving status of a plurality of loads to determine whether each of the plurality of loads is properly driven; increasing a drive voltage when it is determined that the driving status is improper; checking to determine whether each of the plurality of loads is mounted at a position to receive the drive voltage; and invalidating the monitoring on a load determined to be unmounted as a result of the checking, so as to prevent a result of monitoring on the load unmounted from affecting the control on the drive voltage. With this, it is ensured that the drive voltage is increased by referring to the results of monitoring of the loads determined to be mounted. Accordingly, effective control of the drive voltage is achieved.

It is to be noted that any arbitrary combination or rearrangement of the above-described structural components and so forth are all effective as and encompassed by the present embodiments. Moreover, this summary of the invention does not necessarily describe all necessary features so that the invention may also be sub-combination of these described features.

DETAILED DESCRIPTION OF THE INVENTION

Figure 1:
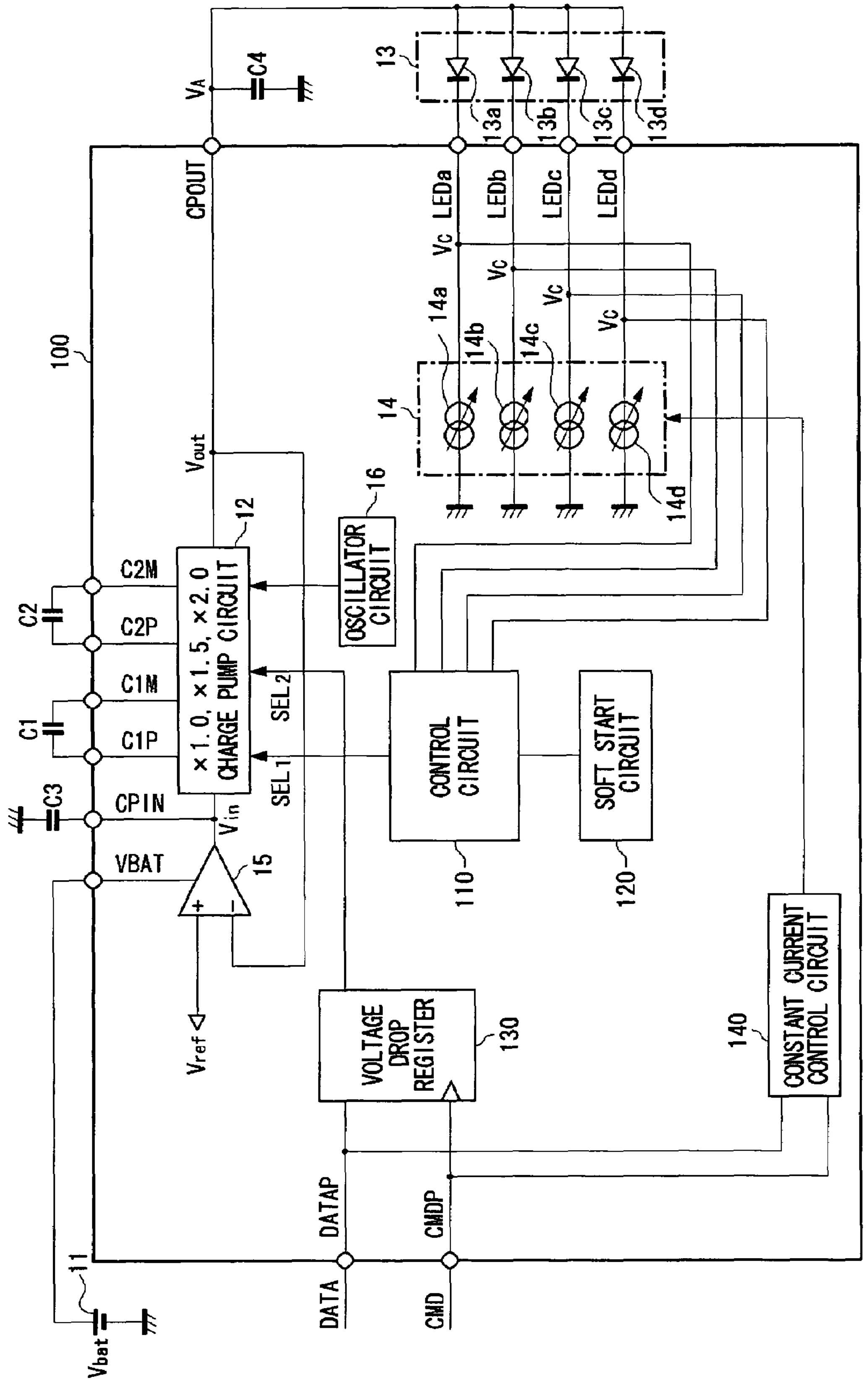
FIG. 1 illustrates the structure of an electronic equipment including a voltage regulating apparatus according to a first embodiment of the present invention.

The invention will now be described based on preferred embodiments which do not intend to limit the scope of the present invention but exemplify the invention. All of the features and the combinations thereof described in the embodiment are not necessarily essential to the invention.

FIRST EMBODIMENT

Before describing the present invention in detail, a summary will be given. A voltage regulating apparatus according to the first embodiment is provided inside a large scale integration (LSI), which is built in battery-driven portable electronic equipment such as cell phones and PDAs. The inventive apparatus boosts the battery voltage of a lithium ion battery or a battery of any of other types so as to supply a drive voltage to a plurality of LEDs used, for example, as backlight of an LCD. The LEDs emit with light colors including red, green and blue when the drive voltage is applied to the LEDs. When a lithium ion battery or a battery of any of other types is consumed, the battery voltage drops, with the result that the proper driving status of the LEDs cannot be maintained. The inventive apparatus boosts the battery voltage with a higher step-up ratio so that the proper driving status of the LEDs is maintained.

As mentioned before, the LSI that includes the voltage regulating apparatus is built, for example, in portable equipment for its use. There is an understanding as described below between a designer of the LSI (for example, an LSI manufacturer) and a designer of a set such as a cell phone (for example, a set manufacturer). In designing the set, the set manufacturer connects LEDs to a terminal of the LSI. According to this understanding, when an LED is not mounted at a position to receive a drive voltage, the LSI manufacturer could require, in the form of LSI specification, the set manufacturer to connect an LSI terminal, which otherwise should be connected to the cathode of the LED, to the ground on a printed board. In accordance with this requirement, the LSI manufacturer connects the LSI terminal to the ground.

During a predetermined period of time (hereinafter, simply referred to as “a soft start period”) after a power button of a portable equipment unit inclusive of the apparatus is held down (hereinafter, simply referred to as “power-on”), the apparatus checks LED by LED (hereinafter, simply referred to as “mount checking process”) to determine whether the LED is mounted at a position to receive a drive voltage. The phrase “soft start period” refers to a period that starts at power-on and elapses until the apparatus makes a transition to a state in which the apparatus is capable of a normal boost operation for boosting the drive voltage and supplying the boosted voltage to the LEDs.

After the soft start period, the apparatus monitors LED by LED to determine the driving status of a plurality of LEDs. For example, the apparatus monitors to find whether the LEDs emit with proper luminance (hereinafter, such monitoring will be referred to as “drive monitoring process”. If it is found as a result of the drive monitoring process that the driving status of at least one of the LEDs is improper, the apparatus increases the drive voltage. In this process, the drive monitoring process on an LED determined to be unmounted as a result of the mount checking process is invalidated. With this, the result of the drive monitoring process on an LED determined to be unmounted is prevented from invoking the increasing of the drive voltage.

FIG. 1 illustrates the structure of an electronic equipment that includes a voltage regulating apparatus 100 according to the first embodiment. The voltage regulating apparatus 100 receives a battery voltage Vbat of a lithium ion battery 11 at VBAT terminal. A charge pump circuit 12 described later boosts the battery voltage Vbat. A resultant drive voltage $V_A$ is supplied to externally coupled LEDs 13*a*-13*d* via CPOUT terminal. The battery voltage Vbat of the lithium ion battery 11 is approximately 3.1-4.2V. At power-on, the soft start period described above is started. The battery voltage Vbat of the lithium ion battery 11 starts to be applied to VBAT terminal. The anode terminals of the LEDs 13*a*-13*d* are connected in parallel at CPOUT terminal. The cathode terminals of the LEDs 13*a*-13*d* are respectively connected to LEDa-LEDd terminals of the voltage regulating apparatus 100. A smoothing capacitor C4 is connected between CPOUT terminal and the ground.

The voltage regulating apparatus 100 is provided with: the charge pump circuit 12 for boosting an input voltage $V_{in}$ by a preset step-up ratio; a regulator circuit 15 for maintaining the input voltage $V_{in}$ input to the charge pump circuit 12 at a constant level; an oscillator circuit 16 for supplying a pulse signal to the charge pump circuit 12; a control circuit 110 for switching between step-up ratios in accordance with a result of the mount checking process and a result of the drive monitoring process; a soft start circuit 120 for performing time-division control on the control circuit 110; a voltage drop register 130 for switching the step-up ratio set in the charge pump circuit 12 to a lower step-up ratio in accordance with an externally supplied signal; constant current circuits 14*a*-14*d* for controlling currents through the LEDs 13*a*-13*d* to be constant; and a constant current control unit 140 for designating the value of the constant current generated by the constant current circuits 14*a*-14*d*. Those of the elements described above that require resetting to an initial state are reset at power-on or when a predetermined condition is fulfilled.

The regulator circuit 15 includes an operational amplifier implemented by a differential amplifier and an output transistor having its gate voltage controlled by the operational amplifier. The regulator circuit 15 lowers the battery voltage Vbat and supplies the input voltage $V_{in}$ to the charge pump circuit 12. The regulator circuit 15 compares the output voltage $V_{out}$ of the charge pump circuit 12 with a reference voltage $V_{ref}$ so as to control the input voltage $V_{in}$ of the charge pump circuit 12 such that a difference is eliminated. An end of a smoothing capacitor C3 is connected to a node between the regulator circuit 15 and the charge pump circuit 12 via CPIN terminal. The other end of the smoothing capacitor C3 is grounded.

The charge pump circuit 12 functions as a voltage supply circuit that supplies the drive voltage to one end, i.e., a first end, of each of a plurality of loads, i.e. the plurality of LEDs 13. A first boost capacitor C1 and a second boost capacitor C2 are connected to the charge pump circuit 12 via four terminals including C1P terminal, C1M terminal, C2P terminal and C2M terminal. At the end of the soft start period, the step-up ratio of the charge pump circuit 12 is set to 1.0. Further, the charge pump circuit 12 achieves step-up ratios of 1.5 and 2.0 by subjecting the first boost capacitor C1 and the second boost capacitor C2 to switching control according to a predetermined pattern, using the pulse signal from the oscillator circuit 16 described later. The oscillator circuit 16 generates a pulse of a preset frequency and supplies the same to the charge pump circuit 12. When the output voltage $V_{out}$ of the charge pump circuit 12 exceeds the reference voltage $V_{ref}$, the regulator circuit 15 lowers the input voltage $V_{in}$ input to the charge pump circuit 12. When the output voltage $V_{out}$ drops below the reference voltage $V_{ref}$, the regulator circuit 15 regulates the input voltage $V_{in}$ to increase it. Thus, the output voltage $V_{out}$ of the charge pump circuit 12 are maintained at a constant level. The output voltage $V_{out}$ of the charge pump circuit 12 is output as a drive voltage $V_A$ via CPOUT terminal and supplied to the LEDs 13*a*-13*d*.

The drive voltage $V_A$ output from the voltage regulating apparatus 100 is applied to the anode terminals of the LEDs 13*a*-13*d* for light emission. FIG. 1 illustrates the LEDs 13*a*-13*d* emitting light of a variety of colors. For example, a voltage drop of about 3.6V occurs in a blue LED, 1.6V occurs in a red LED, and 1.8V occurs in a green LED. The voltage drop may differ depending on the drive current and the atmospheric temperature. For prevention of flicker and maintenance of constant luminance, constant current driving is required. For this purpose, constant current control is performed by the constant current circuits 14 described later.

Each of the constant current circuits 14*a*-14*d* is provided for a corresponding one of the LEDs 13*a*-13*d*. One end of each of the constant current circuits 14*a*-14*d* is connected to the cathode, i.e., a second end, of the corresponding one of the LEDs 13*a*-13*d* via a corresponding one of LEDa-LEDd terminals. The other end of each of the constant circuits 14*a*-14*d* is grounded. As described above, the constant circuits 14*a*-14*d* control the current through the LEDs 13*a*-13*d* to be constant. In accordance with a direction from the constant current control unit 140, each of the constant current circuits 14*a*-14*d* generates a constant current of, for example, 1 mA, 10 mA, 15 mA and 20 mA. Each of the constant current circuits 14*a*-14*d* is capable of generating a designated constant current when the voltage at LEDa-LED d terminals is higher than a predetermined preset voltage. On the contrary, when the voltage at LEDa-LEDd terminals is lower than the preset voltage, the designated constant current cannot be generated due to saturation of transistors internally used. When constant current control is disabled, flicker or insufficient luminance of the LEDs 13*a*-13*d* results. According to this embodiment, the above-mentioned preset voltage is referred to as a boost reference voltage and is configured to be, for example, 0.3V.

The control circuit 110 performs the mount checking process for each of the LEDs during the soft start period and stores results of checking. The mount checking process according to this embodiment is such that the potential $V_C$ at LED*a*-LED*d* terminals (hereinafter, simply referred to as an LED terminal voltage) is compared with a predetermined voltage (hereinafter, simply referred to as a mount reference voltage). When it is found that the LED terminal voltage $V_C$ is below the mount reference voltage, the control circuit 110 determines that the LED to be connected to that LED terminal is not mounted. In this embodiment, the mount reference voltage is a voltage in the neighborhood of the ground potential. For example, the mount reference voltage is set to 0.15V. When the LED terminal voltage $V_C$ is below the mount reference voltage of 0.15V, it is determined that a corresponding one of LEDa-LEDd terminals is grounded by the set manufacturer. When this determination is made, a corresponding one of the LEDs 13a-13d connected to the grounded LED terminal, i.e., one of LED terminals 13a-13d, can be excluded from the drive monitoring process. The mount reference voltage may be a predetermined fixed potential. In this embodiment, the mount reference voltage is configured to be lower than the boost reference voltage.

After the soft start period, the control circuit 110 performs the drive monitoring process on each of the LEDs. If it is determined that the driving status of at least one LED of the LEDs 13a-13d is improper, the control circuit 110 directs the step-up ratio of the charge pump circuit 12 to be increased. The drive monitoring process according to this embodiment is a process for comparing the LED terminal voltage $V_C$ with the boost reference voltage. When the LED terminal voltage $V_C$ at any of the terminals drops below the boost reference voltage, the control circuit 110 sends out a boost signal SEL1 at a high level so as to increase the step-up ratio of the charge pump circuit 12. In this process, the control circuit 110 invalidates the drive monitoring process on an LED determined to be unmounted by referring to the results of checking stored in the soft start period. With this, the result of the drive monitoring process on the LED determined to be unmounted is prevented from affecting the control of the step-up ratio of the charge pump circuit 12.

The soft start circuit 120 directs the control circuit 110 to perform the mount checking process during the soft start period and to perform the drive monitoring process after the soft start period. Moreover, the soft start circuit 120 controls the control circuit 110 to store the results of the mount checking process during the soft start period and to maintain the results after the soft start period.

When there is a direction from external software (not shown) to lower the step-up ratio, the voltage drop register 130 sends a voltage drop signal SEL2 at a high level so as to lower the step-up ratio of the charge pump circuit 12. A data signal DATA and a command signal CMD are input to the voltage register 130 via DATAP terminal and CMDP terminal of the voltage regulating apparatus 100, respectively. When the command signal CMD is a write command and the data signal DATA is at a high level, "1" is written in the voltage drop register 130. In this state, the voltage drop register 130 directs the charge pump circuit 12 to lower the step-up ratio. When the step-up ratio of 1.0 is set in the charge pump circuit 12, the external software does not direct the voltage drop register 130 to lower the step-up ratio.

When the external software (not shown) directs setting of the value of the constant current fed through the LEDs 13a-13d or directs a change thereof, the constant current control unit 140 directs the constant current circuits 14 to feed the constant current of the designated value. In this way, the value of the constant current fed through the LEDs 13a-13d is set or changed. The direction from the constant current control unit 140 is provided in the form of the data signal DATA and the command signal CMD input via DATAP terminal and CMDP terminal, respectively.

When the external software issues a direction (hereinafter, simply referred to as a current change direction) designating a change from a large constant current to a small constant current, i.e., a change from, for example, 20 mA to, for example, 1 mA, the external software also issues an direction for causing the voltage drop register 130 to lower the step-up ratio, in addition to the current change direction. Since a change from a large constant current to a small constant current causes the voltage drop due to the constant current fed through the LEDs 13a-13d to be lowered, the lowering of the step-up ratio is necessary to maintain the stable operation of the voltage regulating apparatus 100. In the following, the process flow in the voltage regulating apparatus 100 will be described.

Figure 2:
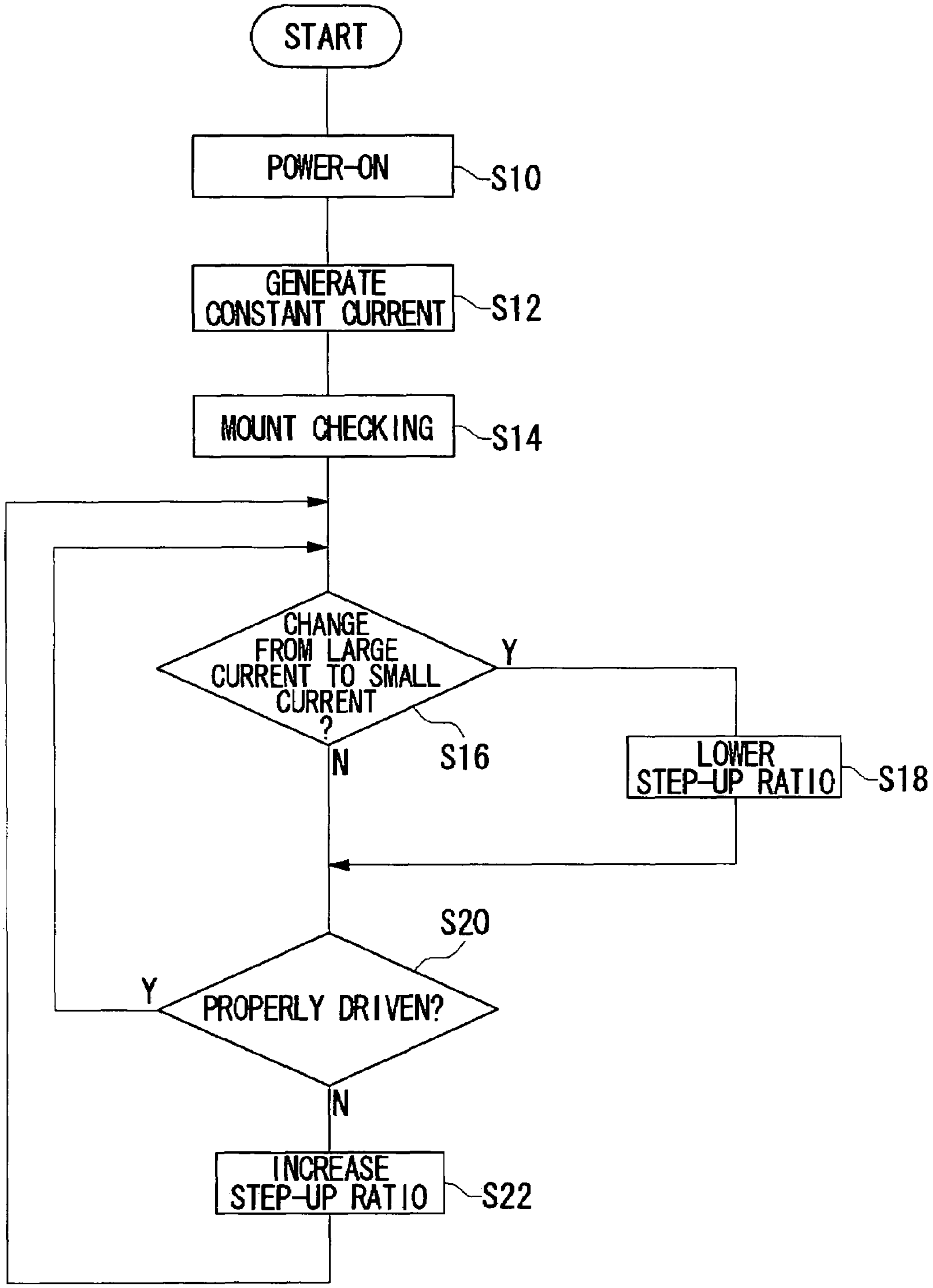
FIG. 2 illustrates a process flow in the voltage regulating apparatus according to the first embodiment.

FIG. 2 illustrates the process flow in the voltage regulating apparatus 100 according to the first embodiment. At power-on (S10), the soft start period is started. During the soft start period, the external software issues a direction for setting a constant current value in the constant current control unit 140. The constant current control unit 140 controls the constant current circuits 14a-14d to feed a constant current of the designated value (S12).

During the soft start period, the voltage regulating apparatus 100 performs the mount checking process by comparing the LED terminal voltage $V_C$ with the mount reference voltage and stores results of checking (S14). After the soft start period, the step-up ratio of the charge pump circuit 12 is automatically set to 1.0.

When the step-up ratio of the charge pump circuit 12 is set to 1.0 and a current change direction is issued (Y of S16), the external software does not provide a direction to lower the step-up ratio, as described before. The step-up ratio of 1.0 is maintained (S18). In the absence of a current change direction (N of S16), the control circuit 100 performs the drive monitoring process by comparing the LED terminal voltage $V_C$ with the boost reference voltage (S20). When it is determined that the driving status of each of the LEDs 13a-13d is proper (Y of S20), a determination is made again as to whether a current change direction is issued (S16). When it is determined that the driving status of at least one of the LEDs 13a-13d is improper (N of S20), the control circuit 110 sends out the boost signal SEL1 at a high level to the charge pump circuit 12 (S22). In accordance with this, the step-up ratio is switched from 1.0 to 1.5.

When the step-up ratio of the charge pump circuit 12 is set to 1.5 and a current change direction is issued (Y of S16), the voltage drop register 130 sends out the voltage drop signal SEL2 at a high level in response to a direction from the external software to lower the step-up ratio. In accordance with this, the step-up ratio is switched from 1.5 to 1.0. In the absence of a current change direction (N of S16), the control circuit 100 performs the drive monitoring process by comparing, LED by LED, the LED terminal voltage $V_C$ with the boost reference voltage. When it is determined that the driving status of each of the LEDs 13a-13d is proper (Y of S20), a determination is made again as to whether a current change direction is issued (S16). When it is determined that the driving status of at least one of the LEDs 13a-13d is improper (N of S20), the control circuit 110 sends out the boost signal SEL1 at a high level to the charge pump circuit 12. In accordance with this, the step-up ratio is switched from 1.5 to 2.0.

When the step-up ratio of the charge pump circuit 12 is set to 2.0 and a current change direction is issued (Y of S16), the voltage drop register 130 sends out the voltage drop signal SEL2 at a high level in response to a direction from the external software to lower the step-up ratio. In accordance with this, the step-up ratio is switched from 2.0 to 1.5. In the absence of a current change direction (N of S16), the control circuit 100 performs the drive monitoring process by comparing, LED by LED, the LED terminal voltage $V_C$ with the boost reference voltage. When it is determined that the driving status of each of the LEDs 13a-13d is proper (Y of S20), a determination is made again as to whether a current change direction is issued (S16). When it is determined that the driving status of at least one of the LEDs 13a-13d is improper (N of S20), the control circuit 110 does nothing so that the step-up ratio of 2.0 is maintained (S22).

Figure 3:
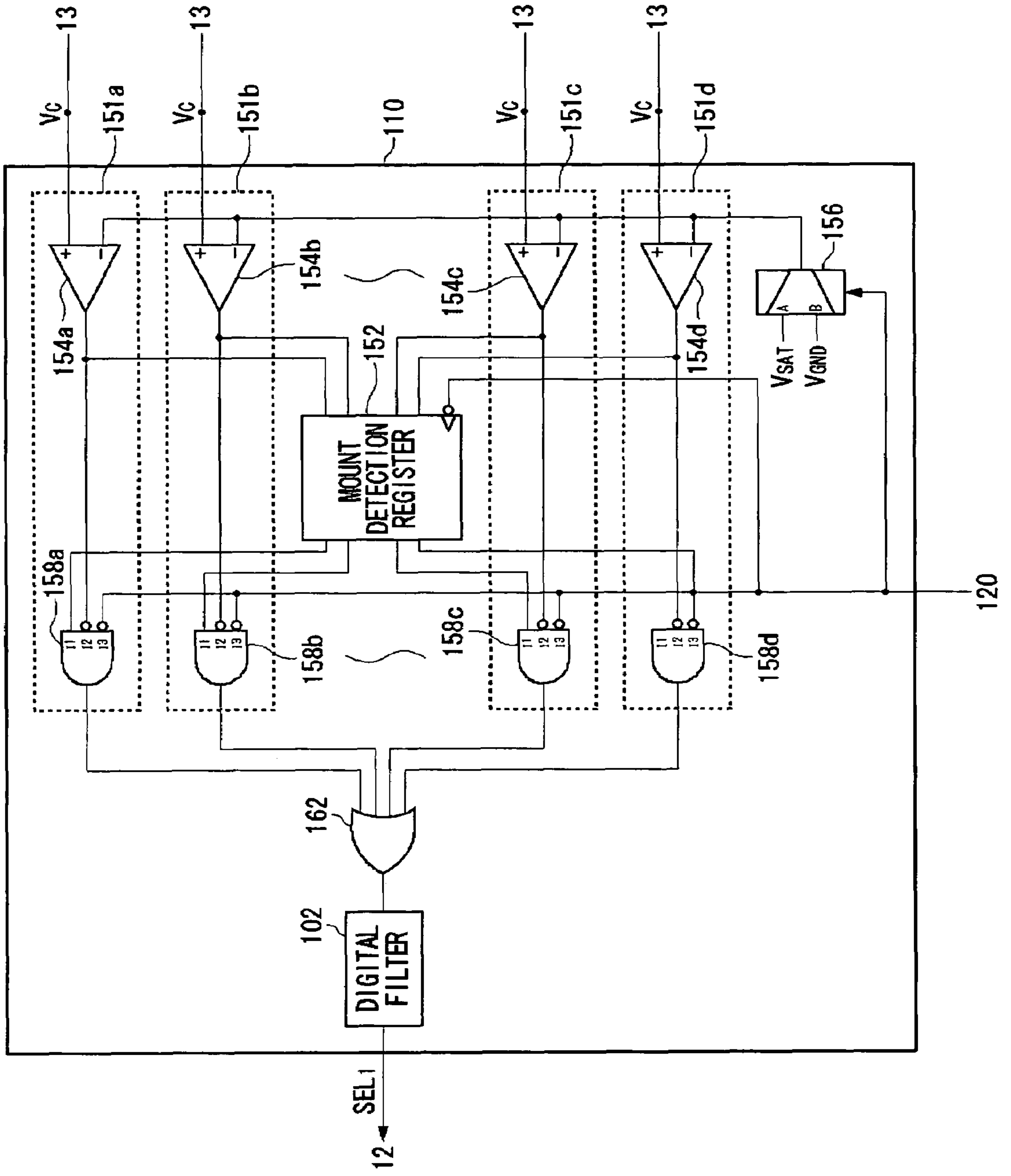
FIG. 3 illustrates the structure of a control circuit according to the first embodiment.

FIG. 3 illustrates the structure of the control circuit 110 according to the first embodiment. As described above, the control circuit 110 performs the mount checking process on each of the LEDs during the soft start period and stores results of checking. After the soft start period, the control circuit 110 performs the drive monitoring process on each of the LEDs. In this process, the control circuit 110 invalidates the drive monitoring process on an LED determined to be unmounted so as to prevent the result of the drive monitoring process on the LED not mounted from affecting the control for increasing the step-up ratio.

The control circuit 110 is provided with: first through fourth comparison processing units 151*a*-151*d* respectively provided for the LEDs 13*a*-13*d*; an OR gate 162 generating a logical OR of outputs from the first through fourth comparison processing units 151*a*-151*d*; a mount detection register 152 for holding results of the mount checking process; a selector 156 which selects a mount reference voltage $V_{GND}$ input to a first selector input terminal A or a boost reference voltage $V_{SAT}$ input to a second selector input terminal B, in accordance with a signal supplied from the soft start circuit 120, and which sends out the selected voltage to the first comparators 154*a*-154*d* described later; and a digital filter 102.

The first comparison processing unit 151*a* is provided with a first AND gate 158*a* and a first comparator 154*a*. The AND gate 158*a* outputs a high level when a high level is input to a first input terminal I1, a low level is input to a second input terminal I2 and a low level is input to a third input terminal I3.

The first comparator 154*a* performs the mount checking process and the drive monitoring process on a time division basis. More specifically, during the soft start period, the first comparator 154*a* compares the LED terminal voltage $V_C$ of the LED 13*a* with the mount reference voltage $V_{GND}$. After the soft start period, the first comparator 154*a* compares the LED terminal voltage $V_C$ of the LED 13*a* with the boost reference voltage $V_{SAT}$. The result of comparison by the first comparator 154*a* is input to the second input terminal I2 of the first AND gate 158*a* and also to the mount detection register 152 described later.

The first input terminal I1 of the first AND gate 158*a* receives a signal from the mount detection register 152. The second input terminal I2 receives a signal from the first comparator 154*a*. The third input terminal I3 receives a signal from the soft start circuit 120. The first AND gate 158*a* outputs a logical AND of the signals. The structure of each of the second through fourth comparison processing units 151*b*-151*d* is similar to that of the first comparison processing unit 151*a*.

The selector 156 selects the mount reference voltage $V_{GND}$ and supplies it to the inverting input of each of the first comparators 154*a*-154*d*, when a high-level signal is input from the soft start circuit 120 during the soft start period. The selector 156 selects the boost reference voltage $V_{SAT}$ and supplies it to the inverting input of each of the first comparators 154*a*-154*d*, when a low-level signal is input during the soft start period. The mount detection register 152 stores results of checking from the first comparators 154*a*-154*d* when the soft start period is terminated by switching. The stored results are latched in the mount detection register 152. More specifically, the mount detection register 152 functions as a latch circuit that permanently holds the results of mount checking stored during the soft start period. The drive monitoring process after the soft start period continues to be invalidated or validated in accordance with the latched result.

The OR gate 162 sends out a logical OR of the inputs from the first through fourth comparison processing units 151*a*-151*d* as the boost signal SEL1 to the charge pump circuit 12 via the digital filter 102. The digital filter 102 is provided to ensure that the result of the drive monitoring process, produced in a case where the LED terminal voltage $V_C$ drops temporarily below the boost reference voltage $V_{SAT}$ as a result of a temporary undershoot current occurring in a corresponding one of the LEDs 13*a*-13*d*, from affecting the control of the step-up ratio. More specifically, a signal not maintained at a high level or a low level for a predetermined period of time is prohibited by the digital filter 102 from triggering the step-up ratio control. A description will now be given of the operation of the control circuit 110 according to this embodiment.

During the soft start period, the control circuit 110 performs the mount checking process on each of the LEDs and stores the results of checking. More specifically, during the soft start period, the selector 156 supplies the mount reference voltage $V_{GND}$ to the inverting input of the first comparators 154*a*-154*d* in accordance with a high-level signal from the soft start circuit 120. Each of the first comparators 154*a*-154*d* performs the mount checking process by comparing the LED terminal voltage $V_C$ of the corresponding one of the LEDs 13*a*-13*d*, with the mount reference voltage $V_{GND}$. The result of checking is stored in the mount detection register 152 and latched in that state. During the soft start period, a high-level signal is input to the third input terminal I3 of each the first AND gates 158*a*-158*d*. Therefore, the output from each of the first AND gates 158*a*-158*d* is at a low level. This causes the boost signal SEL1 to be at a low level. Accordingly, the control for increasing the step-up ratio is not performed during the soft start period.

After the soft start period, the control circuit 110 performs the drive monitoring process on each of the LEDs. In this process, the control circuit 110 invalidates the drive monitoring process on an LED determined to be unmounted so as to prevent the result of the drive monitoring process on the LED not mounted from affecting the control for increasing the step-up ratio. More specifically, after the soft start period, the selector 156 supplies the boost reference voltage $V_{SAT}$ to the inverting input of each of the first comparators 154*a*-154*d* in response to a low-level signal from the soft start circuit 120. Each of the first comparators 154*a*-154*d* performs the drive monitoring process by comparing the LED terminal voltage $V_C$ of the corresponding one of the LEDs 13*a*-13*d* with the boost reference voltage $V_{SAT}$.

The checking result is input to the first input terminal I1 of each of the first AND gates 158*a*-158*d*. The checking result is input to the second input terminal I2. A low level is input to the third input terminal I3. The step-up ratio of the charge pump circuit 12 is controlled in accordance with a logical AND of these. In this state, the first AND gates 158*a*-158*d* is capable of invalidating the drive monitoring process on an LED determined to be unmounted so as to prevent the result of the drive monitoring process on that LED from affecting the control for increasing the step-up ratio.

According to the voltage regulating apparatus 100 of this embodiment, the drive voltage is increased by referring to the results of monitoring of the LEDs determined to be mounted. Accordingly, effective control of the drive voltage is achieved. As described before, the drive monitoring process on the LED determined to be unmounted is invalidated. With this, the control circuit 110 is prevented from detecting a failure and allowing the step-up ratio to be increased, when an LED is not mounted at a position to receive a drive voltage. By allowing the first comparators 154a-154d to be time-shared by the mount checking process and the drive monitoring process, the required space and the cost are reduced. By performing the mount checking process during the soft start period that starts at power-on and elapses until the voltage regulating apparatus makes a transition to a state in which it is capable of a normal boost operation, the drive voltage can be immediately boosted in accordance with the results of monitoring of loads being mounted, when the apparatus makes a transition to the normal boosting operation.

Correspondence between different ways to refer to the elements constituting the invention and the first embodiment will be described. The "mount checking circuit" generically corresponds to the first comparators 154a-154d and the mount detection register 152. The "monitoring circuit" also corresponds to the first comparators 154a-154d. The "boost control circuit" corresponds to the OR gate 162.

SECOND EMBODIMENT

Figure 4:
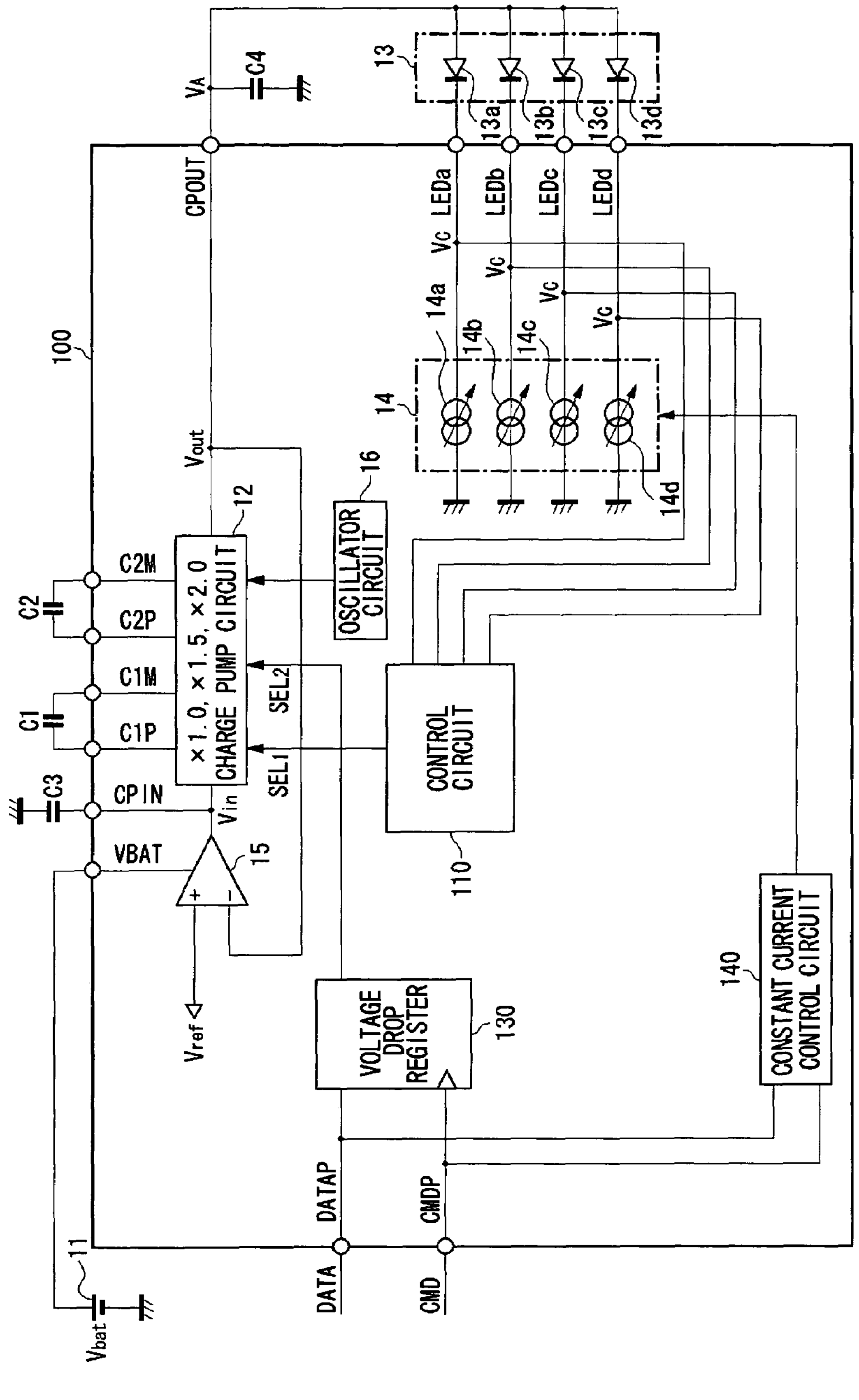
FIG. 4 illustrates the structure of a voltage regulating apparatus according to a second embodiment of the present invention.

FIG. 4 illustrates the structure of the voltage regulating apparatus 100 according to the second embodiment. A difference from the first embodiment is that the mount checking process and the drive monitoring process are not time-divided according to the second embodiment. More specifically, in the voltage regulating apparatus 100 according to the second embodiment, these processes are performed in parallel after the soft start period. The soft start circuit 120 according to the first embodiment is not necessary. The mount checking process and the drive monitoring process according to the above-described structure are performed in a similar way to the first embodiment.

Figure 5:
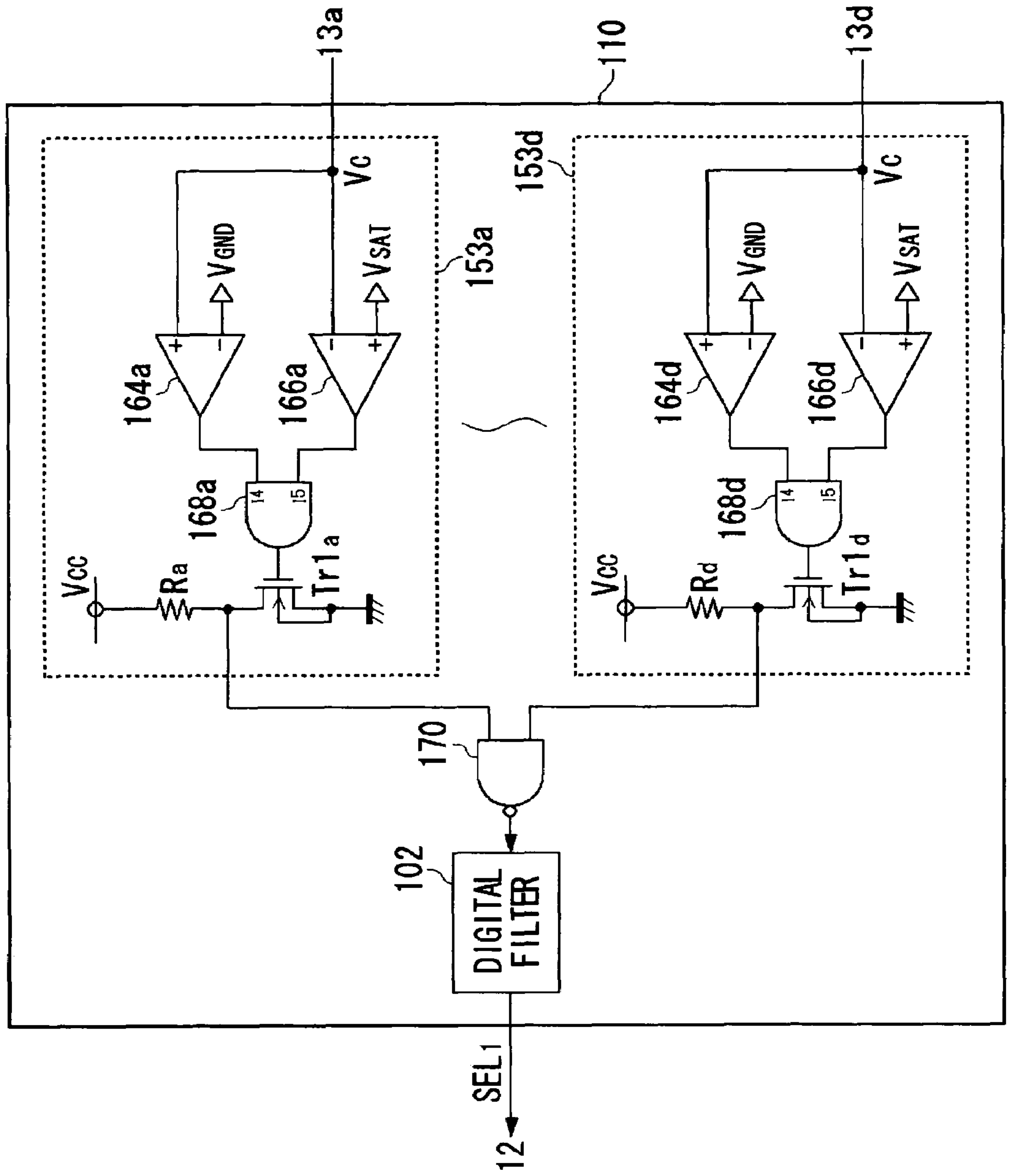
FIG. 5 illustrates the structure of a control circuit according to the second embodiment.

FIG. 5 illustrates the structure of the control circuit 110 according to the second embodiment. Elements corresponding to those of the first embodiment are represented by like reference numerals and their redundant description is omitted. The control circuit 110 performs the mount checking process and the drive monitoring process without time-dividing them. In this process, the drive monitoring process on LEDs determined to be unmounted as a result of checking is invalidated. In a similar way to the first embodiment, the results of drive monitoring process on the LEDs not mounted are prevented from affecting the control for increasing the step-up ratio.

The control circuit 110 is provided with first through fourth comparison processing units 153a-153d respectively provided for the LEDs 13a-13d, a NAND gate for calculating a logical NAND of outputs from the first through fourth comparison processing units 153a-153d, and the digital filter 102. The second and third comparison processing units 153b and 153c are omitted from the illustration.

The first comparison processing unit 153a is provided with: a second comparator 164a for comparing the LED terminal voltage $V_C$ of the LED 13a with the mount reference voltage $V_{GND}$; a third comparator 166a for comparing the LED terminal voltage $V_C$ of the LED 13a with the boost reference voltage $V_{SAT}$; a second AND gate 168a for outputting a logical AND of a signal input to a fourth input terminal I4 from the second comparator 164a and a signal input to a fifth input terminal I5 from the third comparator 166a; a first transistor Tr1a in a common source mode having its gate connected to an output terminal of the second AND gate 168a; a pull up resistor Ra and a power supply line Vcc. A power supply voltage Vcc is applied to the drain of the first transistor Tr1a via the pull up resistor Ra. In this embodiment, the second comparator 164a performs the mount checking process. The third comparator 166a performs the drive monitoring process. The NAND gate 170 controls the step-up ratio. The second through fourth comparison processing units 153b-153d and the first comparison processing units 153a are similarly constructed.

The NAND gate 170 sends out a logical NAND of the signals output from the first through fourth comparison processing units 153a-153d as the boost signal SEL1 to the charge pump circuit 12 via the digital filter 102. More specifically, the NAND gate 170 boosts the step-up ratio of the charge pump circuit 12 by sending out the boost signal SEL1 at a high level when any of the input signals is at a low level. The operation in the mount checking process and the drive monitoring process in the control circuit 110 according to the second embodiment will be described by taking an example of LED 13a.

The second comparator 164a performs the mount checking process by comparing the LED terminal voltage $V_C$ of the LED 13a with the mount reference voltage $V_{GND}$. When the LED terminal voltage $V_C$ of the LED 13a drops below the mount reference voltage $V_{GND}$, it is determined that the LED 13a is not mounted. In this state, the signal input to the fourth input terminal I4 is at a low level. Therefore, the drive monitoring process in the third comparator 166a is invalidated.

When the driving status of the LED 13a is proper, i.e., when the LED terminal voltage $V_C$ of the LED 13a exceeds the boost reference voltage $V_{SAT}$, a high-level signal is input to the fourth input terminal I4 of the second AND gate 168a and a low-level signal is input to the fifth input terminal I5 thereof. As a result, the first transistor Tr1a is turned off so that a high-level signal from the power supply line Vcc is input to the NAND gate 170. That is, if the driving status is proper, an increase in the step-up ratio is not invoked.

When the driving status of the LED 13a is improper, i.e., when the LED terminal voltage of the LED 13a drops below the boost reference voltage $V_{SAT}$, the signal input to the fifth input terminal I5 is at a high level. As a result, the first transistor Tr1a is turned on so that a low-level signal is input to the NAND gate 170. That is, if the driving status is improper, an increase in the step-up ratio is invoked.

Thus, the monitoring by the third comparator 166a on the LED13a determined to be unmounted as a result of the mount checking process by the second comparator 164a is invalidated. That is, the result of the drive monitoring process by the third comparator 166a is prevented from invoking an increase in the step-up ratio. With this, it is ensured that the drive voltage is increased by referring to the results of monitoring of the LEDs determined to be mounted. Accordingly, effective control of the drive voltage is achieved.

Correspondence between different ways to refer to the elements constituting the invention and the second embodiment will be described. The "mount checking circuit" corresponds to the second comparators 164a-164d. The "monitoring circuit" corresponds to the third comparators 166a-166d. The "boost control circuit" corresponds to the NAND gate 170.

THIRD EMBODIMENT

A difference between the third embodiment and the second embodiment is that the mount checking process and the drive monitoring process are not performed in parallel in the voltage regulating apparatus 100 according to the third embodiment. The structure of the voltage regulating apparatus 100 according to the third embodiment is similar to the structure of the voltage regulating apparatus 100 according to the second embodiment. A difference lies in the internal structure of the control circuit 110. The mount checking process and the drive monitoring process according to the structure of the third embodiment is similar to those of the second embodiment.

Figure 6:
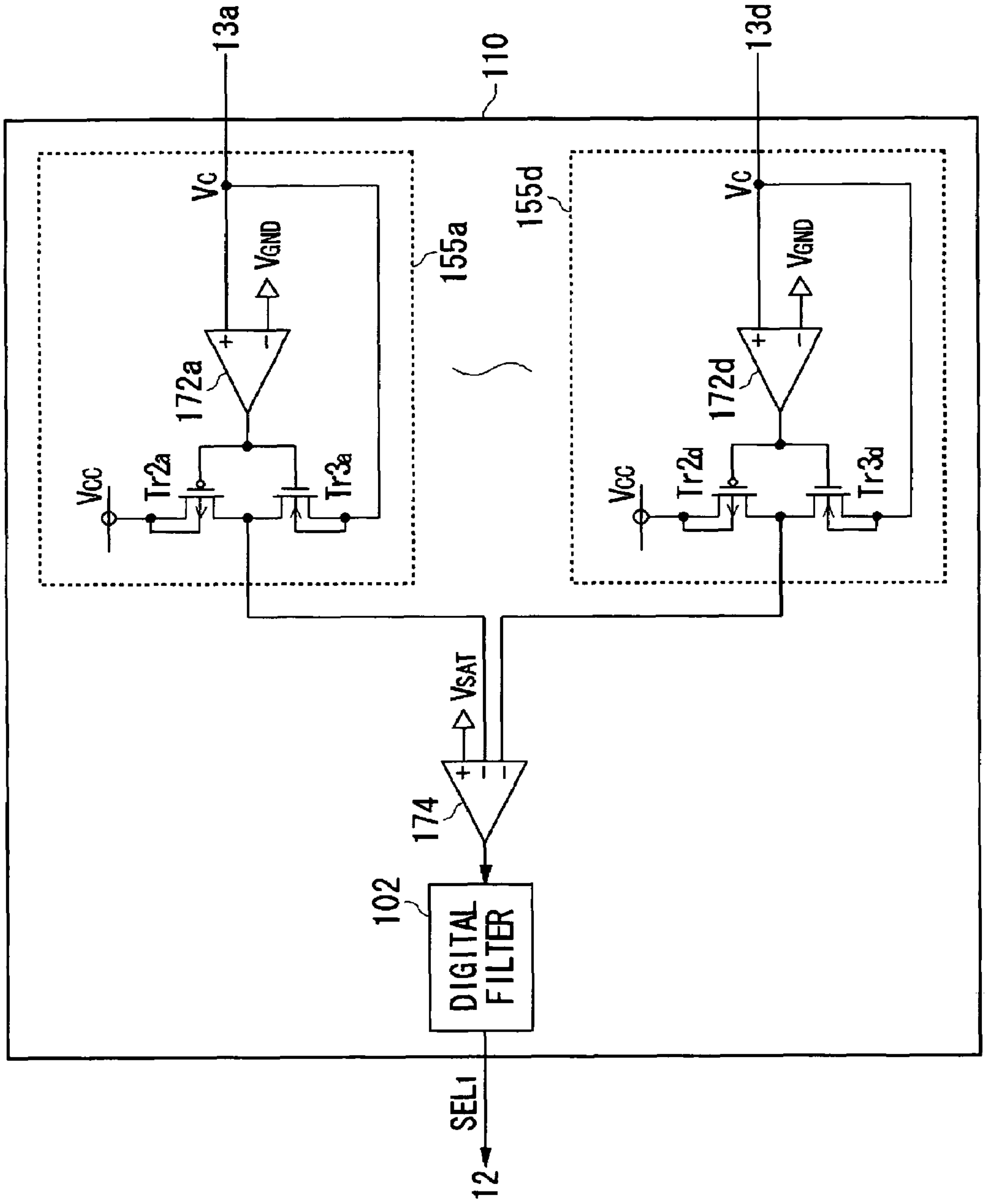
FIG. 6 illustrates the structure of a control circuit according to a third embodiment of the present invention.

FIG. 6 illustrates the structure of the control circuit 110 according to the third embodiment. Elements corresponding to those of the second embodiment are represented by like reference numerals and their redundant description is omitted. The control circuit 110 is provided with the first through fourth comparison processing units 155*a*-155*d* respectively provided for the LEDs 13*a*-13*d*, a fifth comparator 174 for comparing outputs from the first through fourth comparison processing units 155*a*-155*d* with the boost reference voltage $V_{SAT}$, and the digital filter 102.

The comparison processing unit 155*a* is provided with: a fourth comparator 172*a* for comparing the LED terminal voltage $V_C$ with the mount reference voltage $V_{GND}$ and outputs a signal of a high level or a low level; a power supply line Vcc; a second transistor Tr2*a* of a PMOS type having its gate connected to an output terminal of the fourth comparator 172*a* and having the power supply Vcc applied to its source; and a third transistor Tr3*a* of an NMOS type having its gate connected to the output terminal of the fourth comparator 172*a* and having the LED terminal voltage $V_C$ applied to its source. The second through fourth comparison processing units 155*b*-155*d* and the first comparison processing units 155*a* are similarly constructed.

The fifth comparator 174 compares voltages output from the first through fourth comparison processing unit 155*a*-155*d* with the boost reference voltage $V_{SAT}$ and sends out a result of comparison as the boost signal SEL1 to the charge pump circuit 12 via the digital filter 102. The operation in the mount checking process and the drive monitoring process in the control circuit 110 according to the third embodiment will be described by taking an example of LED 13*a*.

The fourth comparator 172*a* performs the mount checking process by comparing the LED terminal voltage $V_C$ of the LED 13*a* with the mount reference voltage $V_{GND}$. When the LED terminal voltage $V_C$ of the LED 13*a* drops below the mount reference voltage $V_{GND}$, it is determined that the LED 13*a* is not mounted. In this case, the fourth comparator 172*a* outputs a low level signal. With this, the second transistor Tr2 is turned on and the third transistor Tr3 is turned off. As a result, the power supply Vcc is fed to the inverting input of the fifth comparator 174. Since the power supply Vcc is configured to be higher than the boost reference voltage $V_{SAT}$, an increase in the step-up ratio is not invoked.

When the driving status of the LED 13*a* is proper, i.e., when the LED terminal voltage $V_C$ corresponding to the LED 13*a* is equal to higher than the boost reference voltage $V_{SAT}$, the fourth comparator 172*a* outputs a signal at a high level since the LED terminal voltage $V_C$ is higher than the mount reference voltage $V_{GND}$. The signal at a high level is sent out to the second transistor Tr2*a* and the third transistor Tr3*a*. As a result of the second transistor Tr2*a* being turned off and the third transistor Tr3*a* being turned on, the LED terminal voltage $V_C$ is directly input to the inverting input terminal of the fifth comparator 174*a*. Since the LED terminal voltage $V_C$ in this case is higher than the boost reference voltage $V_{SAT}$, an increase in the step-up ratio is not invoked.

When the driving status of the LED 13*a* is improper, i.e., when the LED terminal voltage of the LED 13*a* drops below the boost reference voltage $V_{SAT}$, the LED terminal voltage $V_C$ is directly input to the inverting input of the fifth comparator 174*a* in a similar way to the case described above. Since the LED terminal voltage $V_C$ in this case is lower than the boost reference voltage $V_{SAT}$, an increase in the step-up ratio is invoked. In this case, the fifth comparator 174*a* sends out the boost signal SEL1 at a high level to the charge pump circuit 12 via the digital filter 102 so as to increase the step-up ratio.

Thus, the result of the drive monitoring process on the LED 13*a* determined to be unmounted as a result of the mount checking process by the fourth comparator 172*a* does not invoke an increase in the step-up ratio. With this, it is ensured that the drive voltage is increased by referring to the results of monitoring of the LEDs determined to be mounted. Accordingly, effective control of the drive voltage is achieved.

Correspondence between different ways to refer to the elements constituting the invention and the third embodiment will be described. The "mount checking circuit" corresponds to the fifth comparator 174. The "monitoring circuit" corresponds to the fourth comparators 172*a*-172*d*. The "boost control circuit" corresponds to the fifth comparator 174.

Described above is an explanation based on the embodiment. The embodiment of the present invention is only illustrative in nature and it will be obvious to those skilled in the art that various variations in constituting elements and processes are possible within the scope of the present invention.

In the embodiments, the LEDs 13 are given as an example of load connected to the voltage regulating apparatus 100. The apparatus can of course be applied to any equipment operable by utilizing the voltage regulating apparatus 100 as a source of power. For example, the inventive apparatus may be applied to fans, heaters, motors and communication units.

In the embodiments, circuit elements and blocks constituting the voltage regulating apparatus 100 may be integrated entirely, or integrated to produce a plurality of integrated circuits. Some of the elements may be implemented as discrete components. The target for integration may be decided in accordance with the cost or occupied area.

What is claimed is:

1. A voltage regulating apparatus comprising:

a voltage supplying circuit which applies a drive voltage to a first end of each of a plurality of loads;

a mount checking circuit which checks, load by load, to determine whether each of the plurality of loads is mounted;

a monitoring circuit which monitors a voltage occurring at a second end of each of the plurality of loads as a result of applying the drive voltage or which monitors an associated voltage, the monitoring being done load by load; and a boost control circuit which increases the drive voltage output from the voltage supplying circuit when it is determined as a result of the monitoring by the monitoring circuit that the monitored voltage drops below a preset voltage, wherein the monitoring circuit invalidates the monitoring on the load determined to be unmounted as a result of the checking by the mount checking circuit, so as to prevent a result of monitoring on the load unmounted from affecting the control on the drive voltage by the boost control circuit, wherein the mount checking circuit is provided with a plurality of voltage comparators which compare, for each of the plurality of loads, the voltage at the monitored terminal with a predetermined threshold voltage supplied commonly to the plurality of voltage comparators, the mount checking circuit determining that a load is not connected to the monitored terminal when the voltage at the monitored terminal is lower;

the mount checking circuit and the monitoring circuit time-share a single comparator for a given one of the plurality of loads; and the voltage at the monitored terminal is input to one input terminal of the single comparator for the given one of the plurality of loads, and one of a reference voltage to be used in the monitoring circuit and a reference voltage to be used in the mount checking circuit is switchably input to the other input terminal.

2. The voltage regulating apparatus according to claim 1, wherein the mount checking circuit checks the voltage at a monitored terminal, the checking being done on an assumption that the voltage is fixed at a predetermined value in a situation where the load is not connected to the monitored terminal.

3. The voltage regulating apparatus according to claim 1, wherein the mount checking circuit performs the checking during a predetermined period of time and is further provided with a latch circuit which holds a result of checking, and wherein the monitoring circuit validates or invalidates the monitoring in accordance with an output from the latch circuit on a continuous basis.

4. The voltage regulating apparatus according to claim 1, wherein the monitoring circuit monitors a voltage applied to each of a plurality of constant current circuits each connected in series with a corresponding one of the plurality of loads.

5. The voltage regulating apparatus according to claim 4, wherein the monitoring circuit is provided with a plurality of voltage comparators each of which compares the voltage applied to a corresponding one of the plurality of constant current circuits with the preset voltage.

6. A voltage regulating apparatus comprising:

a voltage supplying circuit which applies a drive voltage to an a first end of each of a plurality of loads;

a mount checking circuit which checks, load by load, to determine whether each of the plurality of loads is mounted;

a monitoring circuit which monitors a voltage occurring at the other a second end of each of the plurality of loads as a result of applying the drive voltage or which monitors an associated voltage, the monitoring being done load by load;

a boost control circuit which increases the drive voltage output from the voltage supplying circuit when it is determined as a result of the monitoring by the monitoring circuit that the monitored voltage drops below a preset voltage; and a drop register which drops the drive voltage supplied by the voltage supplying circuit, in accordance with an externally supplied control signal wherein the monitoring circuit invalidates the monitoring on a the load determined to be unmounted as a result of the checking by the mount checking circuit, so as to prevent a result of monitoring on the load unmounted from affecting the control on the drive voltage by the boost control circuit, wherein the mount checking circuit is provided with a plurality of voltage comparators which compare, for each of the plurality of loads, the voltage at the monitored terminal with a predetermined threshold voltage supplied commonly to the plurality of voltage comparators, the mount checking circuit determining that a load is not connected to the monitored terminal when the voltage at the monitored terminal is lower.

7. The voltage regulating apparatus according to claim 6, further comprising a soft start circuit which directs the mount checking circuit to perform the checking during a soft start period and directs the monitoring circuit to monitor a monitored voltage on a load by load basis.

* * * * *